Oct. 25, 1966  A. R. SMITH  3,280,427
APPARATUS FOR EXTRUDING COMPOSITE BLACK AND WHITE
RUBBER STRIPS FOR WHITE SIDEWALL TIRES
Filed Feb. 3, 1964  2 Sheets-Sheet 1

INVENTOR.
ALLAN R. SMITH
BY *Owen + Owen*
ATTORNEYS

Oct. 25, 1966　　　A. R. SMITH　　　3,280,427
APPARATUS FOR EXTRUDING COMPOSITE BLACK AND WHITE
RUBBER STRIPS FOR WHITE SIDEWALL TIRES
Filed Feb. 3, 1964　　　　　　　　　　　　2 Sheets-Sheet 2

INVENTOR.
ALLAN R. SMITH
BY Owen & Owen
ATTORNEYS

United States Patent Office 3,280,427
Patented Oct. 25, 1966

3,280,427
APPARATUS FOR EXTRUDING COMPOSITE BLACK AND WHITE RUBBER STRIPS FOR WHITE SIDEWALL TIRES
Allan R. Smith, Findlay, Ohio, assignor to Cooper Tire & Rubber Company, Findlay, Ohio, a corporation of Delaware
Filed Feb. 3, 1964, Ser. No. 342,177
3 Claims. (Cl. 18—13)

This invention relates to apparatus for making composite white and black rubber strips to be used in white sidewall tires.

White sidewall tires, particularly those having narrow white stripes, are now made by first positioning a strip of white rubber on that portion of the tire carcass corresponding to the location for the stripe on the finished tire. The white strip must be laid and accurately positioned by hand as the carcass is formed. Two thin strips or laminations of black rubber are then laid by hand over the edges of the white rubber strip, with each of the black strips also requiring careful positioning.

The resulting white stripe often is not concentric nor of uniform width because of the human element in laying up the tire carcass and also because of non-uniformity in the flow of the rubber during vulcanization and curing. Therefore, it is necessary to grind concentric, circular edges on the white stripe in a subsequent operation. In this operation, a portion of each of the overlying strips of black rubber is removed along with a portion of the white rubber if the stripe is to be recessed.

The extra operations required for white sidewall tires having a narrow white stripe render the manufacturing operation a costly one. A substantial part of the extra cost is expended on the labor involved in building up the green tire, with the white stripe and the two separate thin black rubber strips individually and accurately laid by hand. Not only must the three strips be laid up individually, but they must be made in separate operations and then individually handled and cut to proper lengths. The uncured black rubber strips are particularly hard to handle because they are thin and sticky and, when accidentally stuck together, usually cannot be separated without damage.

In addition, to the handling operations, the cost of the tire is also increased because a relatively large strip of the white rubber is required in the manufacturing process. This arises from the fact that the sidewall of the tire must be built up beyond the plies to a given thickness. Because the thin black rubber strips contribute very little to this thickness, the white rubber strip must be sufficiently thick to achieve the proper thickness of the sidewall. Hence, the white rubber strip is substantially thicker and wider than actually required for the resulting white stripe. Because white rubber is more expensive than black rubber, in the order of two-and-one-half times as costly, this factor also adds to the manufacturing cost of the tire.

Along the edges of the ground white stripe, the white rubber strip is covered only by the thin strips or laminations of black rubber. This has the disadvantage that when the pin vent projections, formed during curing on the thin black rubber, are cut off the cured tire, dots of the white rubber are visible. These white dots then must be coated, which requires an additional operation, and the dots still frequently show through after a period of time when the coating wears away. Under conditions of hard use, the remaining portions of the thin black rubber strips adjacent the white stripe also may be partially destroyed, as by abrasion, to expose more white rubber then desired and ruin the appearance of the tire.

The apparatus of the invention provides a composite white and black rubber strip for a white sidewall tire which overcomes the above disadvantages and results in substantial savings in the cost of manufacture of the tire. The apparatus according to the invention basically comprises unique extrusion dies which produce a single composite strip of white rubber and contiguous black rubber which is then applied to the carcass in one operation. The composite strip is much easier to handle than the three separate ones heretofore used and does not require the extra lay-up and cutting operations. This significantly reduces the time necessary to build the green white sidewall tire manually and reduces labor costs. In addition, the composite strip requires less rubber than previously because black rubber portions along the edges of the white strip are no longer in the form of thin strips or laminations, but are extruded to be substantially as thick as the white rubber itself. Hence, a significant amount of white rubber is replaced by black rubber to further lower the cost of materials in the sidewall tire. With reduction in white rubber and the replacement of part of the thin black rubber strips by the thicker extruded strip portions, there is also less chance for white rubber to be exposed at clipped pin vent projections and less chance for black rubber to be worn or abraded away to expose white rubber and mar the appearance of the tire.

The apparatus embodying the invention basically includes two dies, a pre-form die and a final die, which are uniquely designed to produce the composite strip and hold the dimensions of it accurately. The pre-form die has two entirely separate passages which receive the black rubber from one extruder and the white rubber from a second, opposed extruder and carefully form and shape the individual white and black rubber strips of the composite strip. These strips are then maintained separately until just before entering the final die. In this manner, the shapes of the two individual strips are held closely and the relative sizes are also maintained even though the pressures of the white and black rubber being fed to the die passages are of different magnitude. The final overall shape of the composite strip is then formed in the final die which removes unwanted portions of the individual black rubber strip without changing the size or shape of the white rubber strip.

The dies of the new apparatus also can be used to produce strips of varying sizes for white sidewall tires of different sizes by only changing the final dies. Among most sizes of white sidewall tires, the width of the white stripe changes little, if at all. Hence, the white strip used in the composite strip can be of substantially the same size for most tires. However, the width of the overall sidewall of tires does vary from one tire to another with the result that the black rubber of the composite strip must be substantially wider for some tires than for others in order to build the sidewall of the tire to the desired thickness. Consequently, to accommodate different sizes of tires, it is only necessary that the size of the final die opening be changed, which changes the size of the overall composite strip only by changing the size of the black strip, with the white strip remaining unchanged. This can be accomplished simply by removing a few bolts, with very little production time being lost.

It is, therefore, a principal object of the invention to provide improved apparatus for producing a composite black and white sidewall strip having the advantages set forth above.

Other objects and advantages of the invention will be apparent from the following detailed description of a preferred embodiment thereof, reference being made to the accompanying drawing, in which.

Figure 1:
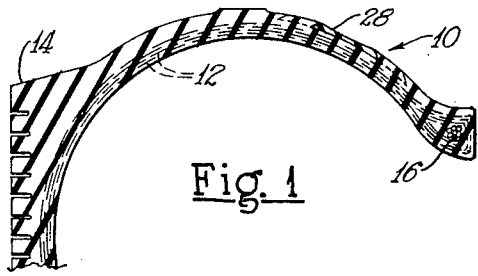
FIG. 1 is a somewhat schematic view in cross section of a tire embodying a composite strip made by the apparatus of the invention.

Referring to the drawings, and more particularly to FIG. 1, part of a cured and finished white sidewall tire embodying the invention is shown in cross section and is generally indicated by the reference numeral 10. Except for the white sidewall area, the tire 10 is of conventional construction, including several plies 12, a tread portion 14, and rim beads 16. The white sidewall portion is formed by a composite strip 18 shown in more detail in FIG. 2. The composite strip 18 consists of a white rubber strip 20 and a black rubber strip or body having two spaced strip portions 22 and 24 contiguous with the edges of the white strip 20 and connected by a thin web 26. After the tire is cured, most of the thin web 26 as well as part of the white rubber strip 20 are ground away to form an annular recess 28 (FIG. 1) which exposes a concentric, narrow white stripe of uniform width.

As previously discussed, the white rubber strip 20 is substantially narrower than those heretofore employed since the thickness of the sidewall of the tire can be achieved through the thick strip portions 22 and 24. Further, a relatively abrupt joint is formed between the white rubber strip 20 and each of the black rubber strip portions 22 and 24, which joints are substantially perpendicular to the surface of the sidewall of the tire. This minimizes the area in which the black rubber overlying the white rubber is thin enough that pin vent projections formed during the vulcanization of the tire will expose the white rubber when clipped off in the usual manner just before final inspection. As previously discussed, the white rubber showing through the clipped vent projections must be painted or coated with black to camouflage them. This requires an extra operation and the black coating frequently wears off after a period of time. The abrupt joint also minimizes the existence of thin black rubber which is subjected to abrasion and which can be physically removed or torn from the tire by rough use. Removal of the black rubber exposes more of the white rubber underneath than is desired, resulting in an unsightly tire because of the wide white portion of the strip then visible.

While the composite strip 18 is shown with the connecting web 26 extending completely between the two strip portions 22 and 24, the web 26 can stop just short or even substantially short of each side of the center of the white strip 20 so that part or even almost all of the white rubber strip 20 is exposed between the edges of the web. In either case, the composite strip 18 is used in the same manner and the advantages are the same. Where the complete connecting web 26 is used, the white strip 20 will not be visible at the sidewall of the tire. However, identification of the white sidewall tire before grinding is achieved when the pin vent projections are severed. When this is done, the severed pin vent projections on the connecting web 26 will expose the white rubber strip 20, so that identification of the tire will be assured without necessity for any additional operations to expose the white rubber for identifying purposes.

While two of the black, spaced, strip portions 22 and 24 are shown, in some instances it may be sufficient to use only one black strip portion contiguous with one edge of the white strip 20.

Figure 4:
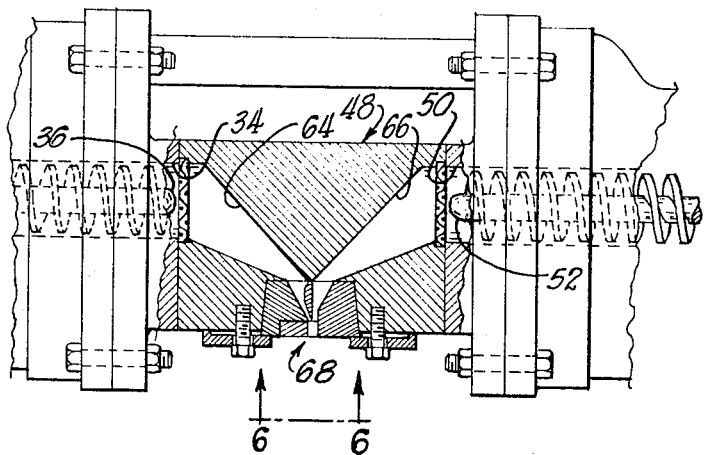
FIG. 4 is an enlarged, fragmentary view, with parts broken away and with parts in cross section, of an extruder and an extruding head of the production line of FIG. 3.

The composite strip 18 is made on a production line, shown in FIG. 4, which includes a black rubber extruder 30 and a white rubber extruder 32. The black rubber extruder 30 has a central supply passage 34 (FIG. 4) through which black rubber supplied by a rotating auger 36. The auger 36 is driven through a gear box 38 which is powered by a direct current motor 40, the speed of which can be accurately controlled. The black rubber is supplied in the form of a narrow, soft strip 42 from a conveyor 44 into a hopper or opening 46 of the extruder. The auger 36 then carries the black rubber through the passage 34 to a die header 48.

The white rubber extruder 32 includes a supply passage 50 and an auger 52 for feeding the white rubber through the supply passage 50. The auger 52 is similarly driven through a gear box 54 by a direct current motor 56. White rubber is supplied in the form of a white rubber strip 58 from a conveyor 60 through a hopper or opening 62 in the extruder 32.

The header 48 can be of any suitable design and includes the usual cooling and heating passages (not shown) for supplying cooling water and steam to various parts of the header. The black and white rubber usually is somewhat heated when supplied as the strips 42 and 58 to the extruders 30 and 32 and this rubber is heated considerably more when placed under pressure by the augers 36 and 52. For this reason, the entrance portions of the header 48 preferably are supplied with cooling water to prevent overheating of the rubber. At the same time, the rubber may cool excessively when passing through the header, and for this reason, steam passages are often provided near the exit portion of the header. In any event, the header 48 includes separate header passages 64 and 66 which communicate with the supply passages 34 and 50 and also with a composite die 68 embodying the invention.

Figure 5:
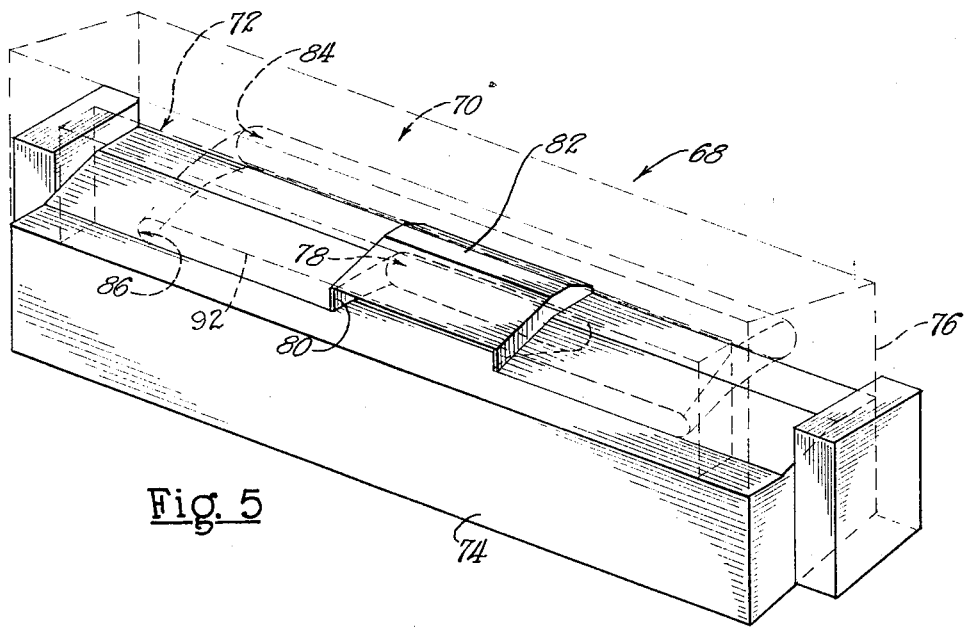
FIG. 5 is a view in perspective, with certain parts in dotted lines, of a pre-form die and a final die embodying the invention, and which is used with the extruding head of FIG. 4.
Figure 6:
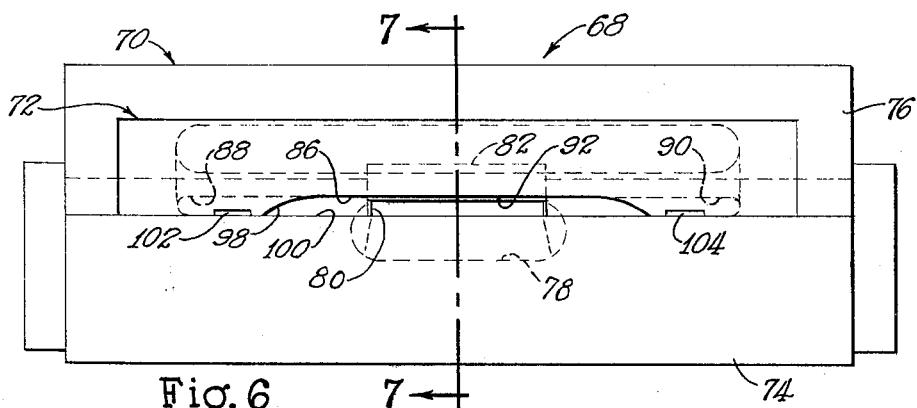
FIG. 6 is a bottom view of the die, taken along the line 6—6 of FIG. 4.
Figure 7:
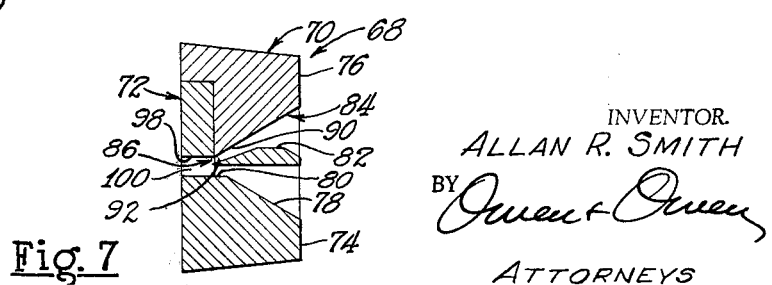
FIG. 7 is a view in transverse cross section taken along the line 7—7 of FIG. 6.

Referring more particularly to FIGS. 5–7, the composite die 68 includes a pre-form die indicated at 70 and a final die indicated at 72. The pre-form die 70 receives white and black rubber in separate passages, shapes them to predetermined positions, and then combines them immediately before entering the final die 72. The white rubber portion 20 of the composite strip 18 does not undergo any substantial change after leaving the pre-form die but the black rubber portions 22 and 24 receive a definite final shaping in the final die 72.

The pre-form die 70 actually includes two parts 74 and 76. The part 74 is shown in solid lines in FIG. 5 while the part 76 is shown dotted, along with the final die 72. The part 74 includes a flared, white rubber passage 78 terminating in a die opening 80 immediately behind and contiguous with the final die 72. The size and shape of the opening 80 determines the size and shape of the white rubber portion 20 of the strip 18 although the width of the white rubber portion 20 can be increased slightly after passing through the pre-form die 70 by increasing the pressure of the white rubber in the extruder 32. The pre-form die part 74 also has a raised portion 82 which projects into a flared black rubber passage 84 formed between the die parts 74 and 76 by a mating surface of the part 74 and a recess in the part 76. The passage 84 terminates in a die opening 86 (FIG. 7) which includes two thicker side portions 88 and 90 (FIG. 6) on each side of the raised portion 82, and a thin bridge portion or web 92 above the raised portion 82 and connecting the thicker side portions 88 and 90.

Figure 2:
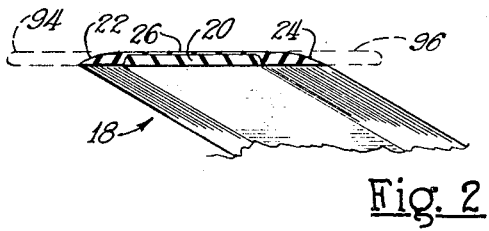
FIG. 2 is a fragmentary view in perspective of the composite strip shown in FIG. 1.

The passages 78 and 84 meet at the openings 80 and 86 with the white and black rubber portions combining at this point. While the raised portion 82 in FIGS. 5 and 6 is shown as having a forward edge with a slight thickness, actually this edge preferably is as close to a knife-edge as possible since the thinner the edge, the more effectively and fully can the white and black rubber combine at the openings 80 and 86. At this position, the white rubber portion 20 has a size and shape as shown in FIG. 2 while the black rubber strip actually has wider thick portions 94 and 96, as shown in dotted lines in FIG. 2.

Immediately upon combining, the white and black rubber at the pre-form die openings 80 and 86 pass through a final die opening 98 in the final die 72. The final die opening 98 has a contour the same as the overall strip 18 of FIG. 2 with the bottom of the die opening 98 being formed by a surface 100 of the pre-form die part 74. The die opening 98 is narrower than the die opening 86 of the pre-form die 70. The final die 72 also has side openings 102 and 104 through which some of the black rubber from the black rubber side portions 94 and 96 can flow in order to prevent the black rubber from stagnating in the side portions. Of course, the final die opening 98 can be wider or narrower than shown, as long as it does not exceed the overall width of the pre-form die opening 86.

By maintaining the white and black rubber separately until immediately before the final die opening 98, the shape of the white and black rubber can be very closely controlled and maintained. Further, by keeping the white rubber shape and size substantially constant through the final die 72, the composite strip 18 can be made wider or narrower to accommodate a particular size tire simply by substituting another of the final dies 72 in which the opening 98 is wider or narrower to change the black rubber size accordingly.

In the production of the composite strip 18, the soft black and white rubber strips 42 and 58 are fed into the extruders 30 and 32 and forced under pressure as soft, hot masses through the passages 34 and 50 by the augers 36 and 52. The rubber then passes through the passages 64 and 66 to the black and white rubber passages 84 and 78. The rubber then continues under pressure to the pre-form die openings 86 and 80 at which time the black and white rubber combines at the knife-edge terminus of the raised portion 82 of the pre-form die part 74. The combined rubber is then forced through the final die opening 98, at which time the black rubber is shaped to its final configuration with the white rubber portion 20 remaining substantially unchanged.

Figure 3:
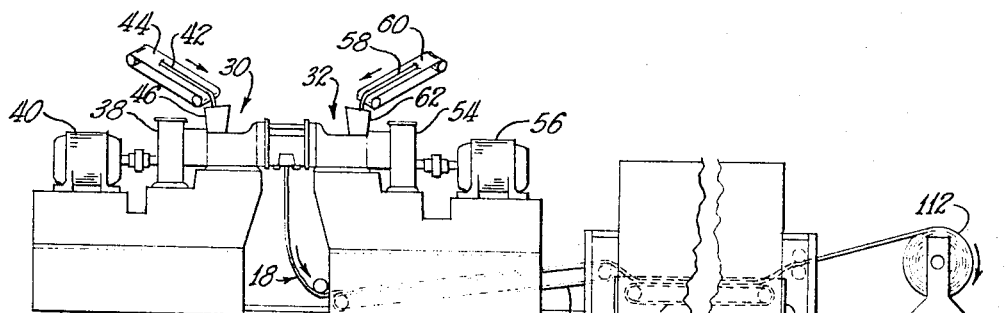
FIG. 3 is a somewhat schematic, fragmentary view in elevation of a production line for producing a composite white and black rubber strip as shown in FIG. 2.

The composite strip 18 then continues downwardly from the final die 72 and onto a belt conveyor 106 (FIG. 3). The strip 18 is fed off the conveyor 106 into a tank 108 containing a suitable coolant and is carried through the coolant on a conveyor 110, with the strip finally being raised and wound onto a suitable roll 112. The roll 112 can be transported to the site at which the tire carcasses are built with the strip 18 fed directly off the roll 112 onto the carcass and cut to length as needed.

Various modifications of the above described embodiment of the invention will be apparent to those skilled in the art, and it is to be understood that such modifications can be made without departing from the scope of the invention, if they are within the scope of the depending claims.

What I claim is:

1. Apparatus for extruding a composite white and black rubber strip for a white sidewall tire, said apparatus comprising a pair of face-to-face extruders each comprising a passage, means for supplying black rubber to one of said passages and for supplying white rubber to the other of said passages, and means for forcing rubber through the passages, a header connected between the adjacent ends of said passages and having a separate passage communicating with each of said extruder passages, a forming die having a first die passage communicating with the one of said header passages which communicates with the one extruder passage, said die passage terminating in a first opening having two spaced portions and a thin connecting web portion, said die also having a second die passage communicating with the one of said header passages which communicates with the other extruder passage, said second die passage terminating in a second opening of generally rectangular cross section, said second die opening being substantially as wide as said web portion of said first die opening and substantially as thick as the two spaced portions of said first die opening, bottom portions of said spaced portions of said first die opening and the bottom of said second die opening lying on substantially a straight line, said first and second die passages intersecting and terminating in a given plane, and a final die having a single passage immediately in front of said first and second openings and of narrower cross section than said first die opening, said final die passage having a cross-sectional shape substantially the same as the cross-sectional shape of the composite strip to be extruded, said final die having a removable part forming the upper contour of the composite strip which is opposite the straight surface of the strip, whereby said removable part can be replaced to form a strip having the same rectangular central cross section of white rubber but a different overall width.

2. Apparatus for extruding a composite white and black rubber strip for a white sidewall tire, said apparatus comprising a pair of extruders each comprising a passage, means for supplying black rubber to one of said passages and for supplying white rubber to the other of said passages, and means for forcing rubber through the passages, a header connected between the adjacent ends of said passages and having a separate passage communicating with each of said extruder passages, a forming die having a first die passage communicating with the one of said header passages which communicates with the one extruder passage, said die passage terminating in a first opening having two spaced thick portions, said die also having a second die passage communicating with the one of said header passages which communicates with the other extruder passage, said second die passage terminating in a second opening of generally rectangular cross section, said second die opening being between said spaced portions of said first opening and substantially as thick as the two spaced portions of said first die opening, bottom portions of said spaced portions of said first die opening and the bottom of said second die opening lying on substantially a straight line, and a final die having a single passage immediately in front of said first and second openings and of narrower cross section than said first die opening of said forming die, said final die passage having a cross-sectional shape substantially the same as the cross-sectional shape of the composite strip to be extruded, said final die having side openings beyond the edges of said final die passage to maintain flow of rubber along the edges of said final die passage.

3. Apparatus according to claim 1 characterized by said removable part of said final die having side grooves beyond the edges of said final die passage which cooperate with the other final die portion when assembled therewith to establish side passages beyond the edges of the final die passage to maintain flow of rubber therethrough.

References Cited by the Examiner

UNITED STATES PATENTS

| | | | |
|---|---|---|---|
| 1,952,469 | 3/1934 | Snyder et al. | 18—13 XR |
| 1,952,470 | 3/1934 | Stephens | 18—13 XR |
| 2,096,362 | 10/1937 | Lehman | 18—12 XR |
| 2,444,831 | 7/1948 | Kilborn | 18—13 |
| 2,569,373 | 9/1951 | Fay | 18—13 |
| 2,686,335 | 8/1954 | Gross | 18—12 |
| 2,807,833 | 10/1957 | Schanz | 18—13 |
| 2,897,543 | 4/1959 | Weston et al. | 18—12 |
| 3,099,859 | 8/1963 | Eilersen | 18—12 |

WILLIAM J. STEPHENSON, *Primary Examiner.*